Nov. 24, 1925.

R. G. LEDIG 1,563,094

VELOCIPEDE

Filed April 11, 1925      2 Sheets-Sheet 1

INVENTOR:
Richard G. Ledig.
BY
Wiedersheim Fairbanks.
ATTORNEYS.

Nov. 24, 1925.
R. G. LEDIG
1,563,094
VELOCIPEDE
Filed April 11, 1925    2 Sheets-Sheet 2
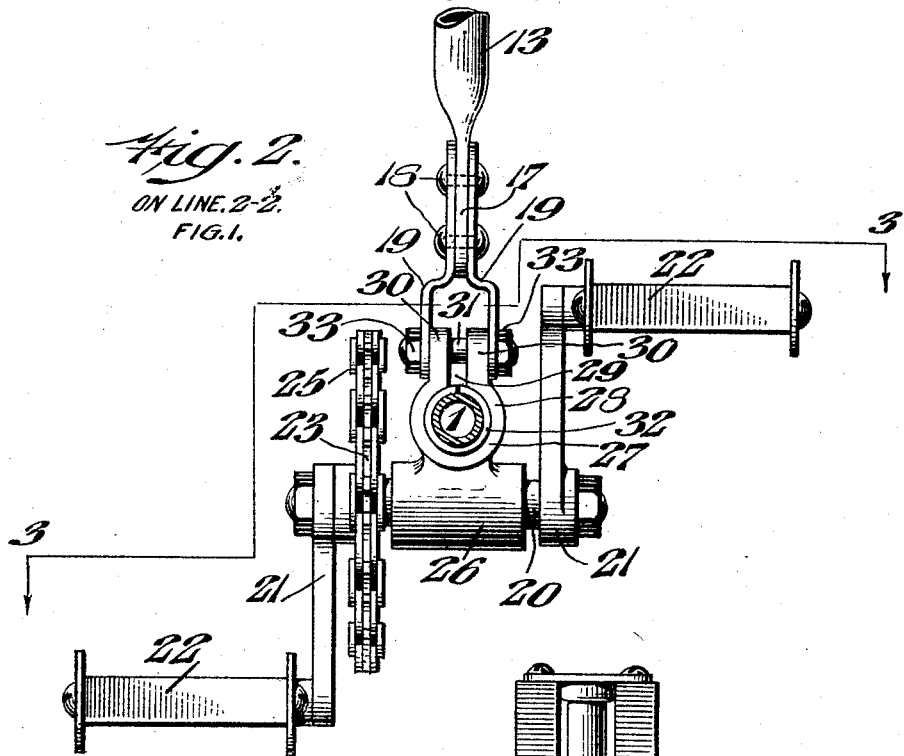
Fig. 2.
ON LINE. 2-2.
FIG. 1.
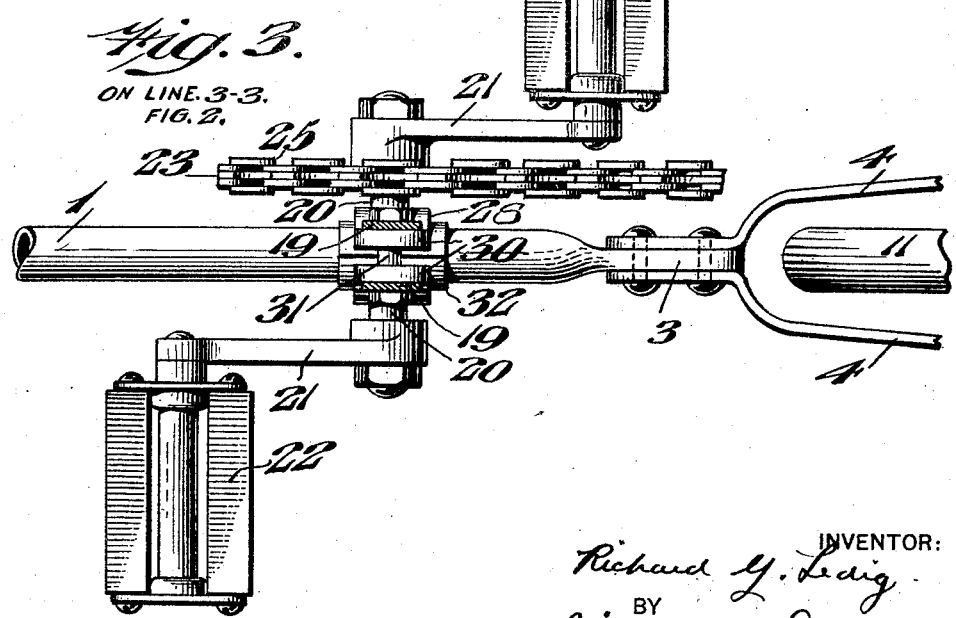
Fig. 3.
ON LINE. 3-3.
FIG. 2.
INVENTOR:
Richard G. Ledig
BY
ATTORNEYS.

Patented Nov. 24, 1925.

1,563,094

UNITED STATES PATENT OFFICE.

RICHARD G. LEDIG, OF PHILADELPHIA, PENNSYLVANIA, ASSIGNOR TO A. MECKY CO., OF PHILADELPHIA, PENNSYLVANIA, A CORPORATION OF PENNSYLVANIA.

VELOCIPEDE.

Application filed April 11, 1925. Serial No. 22,359.

*To all whom it may concern:*

Be it known that I, RICHARD G. LEDIG, a citizen of the United States, residing in the city and county of Philadelphia and State of Pennsylvania, have invented a new and useful Velocipede, of which the following is a specification.

My invention relates to a new and useful velocipede of a novel construction adapted to be used particularly by children and of a construction which is less expensive and more serviceable than constructions known or used heretofore.

My invention further relates to a new and useful construction in bicycles of the character stated, having a novel frame construction which possesses certain adjustable features which render the same more efficient and serviceable and certain novel features of construction whereby a bicycle may be produced at a cost much lower than that of other bicycles made heretofore.

With the above ends in view, my invention consists of a lower frame portion extending the length of the bicycle from the rear axle or spindle to the front steering column, and composed of a tubular portion and a flat strip rear fork portion, permanently secured to the tubular portion, a crank shaft hanger encircling the tubular portion and slidably mounted thereon, a seat-frame portion, consisting of an upright tubular member hingedly secured to said crank shaft hanger at its lower end by means of certain hinge plates and a pivot bolt, which, in addition to providing a hinge pintle for said upper seat-frame member also secures the shaft hanger in any desired position on the lower tubular frame member, a rear support for said seat-frame member, extending from the rear spindle or axle to said tubular seat-frame member and secured thereto, thereby forming a closed triangle with the seat-frame member and the lower frame member.

For the purpose of illustrating my invention, I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawing in which like reference characters indicate like parts:—

Figure 2 represents a section on line 2—2 of Figure 1.

Figure 3 represents a section on line 3—3 of Figure 2.

Figure 1:
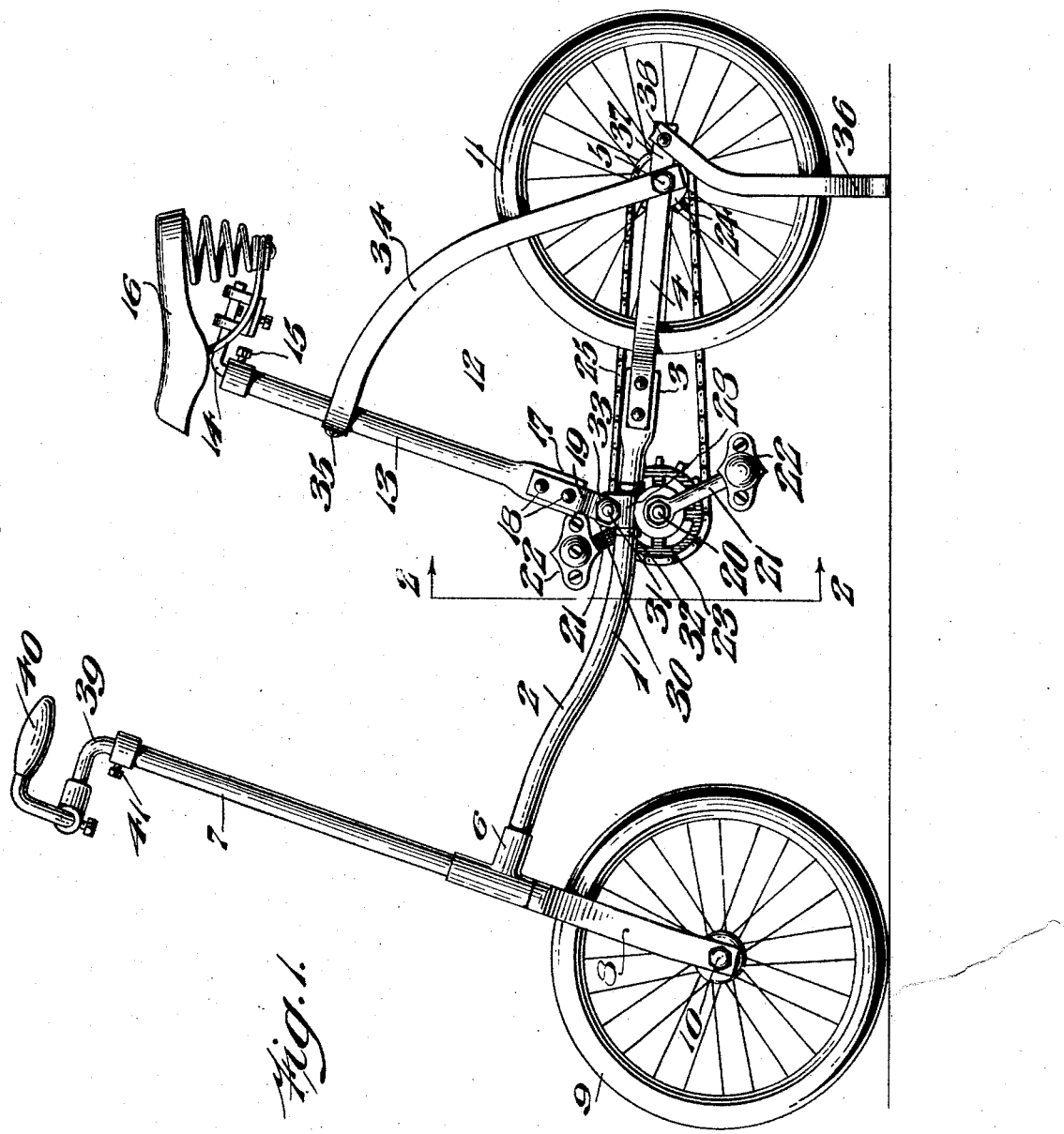
Figure 1 represents a side elevation of a bicycle embodying my invention.

Referring to the drawings, 1 designates the lower frame of the bicycle, composed of the tubular portion 2, having the flattened rear end 3, and the flat strip fork portions 4, permanently secured to the flattened end 3 of the tubular member 2, which lower frame 1, extends between the rear axle or spindle 5 and the steering column bearing or knuckle member 6, which supports the front steering column 7. The front steering column 7 carries the front fork 8, at its lower end, which in turn supports the front wheel 9, pivotally mounted on the front axle or spindle 10, in the usual manner. The rear wheel 11, is similarly mounted in the rear fork 4, upon the rear axle or spindle 5, carried by said fork. The seat-frame 12 is composed of the tubular frame member 13, inclined rearwardly at substantially the same angle as the inclination of the front steering column 7, thereby providing an open space between the seat and the steering column 7, which is unobstructed by any frame member or other portions of the construction. The seat-frame member 13 has attached thereto a seat post 14, extending into its upper end, and secured therein by means of the set screw 15 in the usual manner, which seat post supports the saddle 16, also of a usual construction. The seat-frame member 13 is flattened at its lower end 17 and has secured to said lower end, by means of the rivets 18 or any other suitable fastening means, a pair of hinge plates 19, as shown particularly in Figure 2.

The crank shaft 20, carrying the crank arms 21, pedals 22 and the driving sprocket wheel 23, of the usual construction, which is operatively connected with the rear sprocket wheel 24, by means of the sprocket chain 25, is journaled within the lower bearing portion 26, of the crank shaft hanger 27. The upper portion 28, having an opening therethrough at a right angle to the bearing opening in the lower portion 26, is split at the top, as at 29, and is provided with the ears of the lugs 30, having openings therethrough for the reception of the pivot bolt 31. For the purpose of reinforcing the tubular member 2, of the lower frame 1, at the point where the crank shaft hanger 27 is attached, a split sleeve 32 is interposed between the tubular member 2 and the upper split portion 28 of the crank shaft hanger 27.

The lower ends of the hinge plates 19, provided with suitable pivot holes, are pivotally mounted on the bolt 31, which, after the proper longitudinal adjustment of the crank shaft hanger 27, along the tubular frame member 2, is tightened up by means of the nuts 33, thereby fixing said crank shaft hanger in position and also securing the lower end of the said frame member 13.

In order to provide rear support for the seat-frame member 13, the flat strip members 34 secured at their lower ends to the rear spindle 5, are secured at a proper point to the seat frame member 13, by means of a bolt or other suitable fastening means 35.

In order to provide a support for the bicycle when not in use, I provide a U-shaped bracket or stand 36, pivoted to the extensions 37 of the rear fork members 4, by means of rivets or other fastening means 38. The steering post 39 and handle 40 are secured by merely inserting the lower end of the steering post into the top of column 7 and fixing it therein by means of set screw 41, in the usual manner.

It will thus be seen that by my novel construction I provide an efficient, durable, and very simple construction, permitting of the adjustment of the crank shaft and hence of the sprocket wheel 23, for the purpose of taking up on the chain 25, and also permit of a very efficient and inexpensive seat-frame construction, the lower end of which travels with the crank shaft hanger and hence with the pedals 22, as the crank shaft is adjusted longitudinally along the lower frame member 2, thereby retaining the pedals 22 in the same relative positions with respect to the saddle 16, at all times.

Having thus described my invention, what I claim as new, and desire to secure by Letters Patent is:—

1. In a device of the character stated, a lower longitudinal frame member, a crank shaft hanger engaging the same and slidable thereon, a reinforcing sleeve interposed between said longitudinal frame member and said crank shaft hanger, a seat-frame member, and means common to said seat-frame member and said crank shaft hanger for fixing said crank shaft hanger upon said lower longitudinal frame member and for adjustably securing said frame member to said crank shaft hanger.

2. In a device of the character stated, a crank shaft hanger having a transverse bearing opening for the reception of a crank shaft, a split collar having a longitudinal opening for the reception of a frame member, lugs carried by the split portions of said collar, transverse openings through said lugs, and a clamping bolt extending through said opening for clamping said two split members together.

3. In a device of the character stated, a lower longitudinal frame member composed of a front tubular portion and a rear forked portion secured thereto, a crank shaft hanger slidably mounted on said tubular portion, an upright seat-frame member, a hinge plate carried by the lower end of said seat-frame member, whereby the latter is adjustably secured to said crank shaft hanger, and a brace extending from the upper portion of said frame member to the lower longitudinal member and secured thereto.

4. In a device of the character stated, a lower longitudinal frame member composed of a front tubular portion and a rear forked portion secured thereto, a crank shaft hanger slidably mounted on said tubular portion, an upright seat-frame member adjustably secured to said crank shaft hanger at its lower end, an axle carried by said forked portion, and a brace extending from the upper portion of said seat-frame member, to said axle, and secured thereto.

5. In a device of the character stated, a lower longitudinal frame member composed of a front tubular portion and a rear forked portion secured thereto, a crank shaft hanger slidably mounted on said tubular portion, a reinforcing sleeve interposed between said tubular portion and said shaft hanger, an upright seat-frame member adjustably secured to said crank shaft hanger at its lower end, an axle carried by said forked portion and a brace extending from the upper portion of said seat-frame member, to said axle, and secured thereto.

6. In a device of the character stated, a lower tubular member having its rear end flattened, a rear fork adapted to carry a wheel, and having its forward ends secured to said flattened portion, and a crank hanger adjustably secured upon the rear of said tubular portion.

7. In a device of the character stated, a lower tubular member having its rear end flattened, a rear fork adapted to carry a wheel, and having its forward ends secured to said flattened portion, and a crank hanger adjustably secured upon the rear of said tubular portion; in combination with a tubular seat frame member having its lower end flattened and adjustably secured to said crank shaft hanger.

RICHARD G. LEDIG.